(12) United States Patent
Malek et al.

(10) Patent No.: US 10,363,820 B2
(45) Date of Patent: Jul. 30, 2019

(54) WIRELESS POWER TRANSFER TO A TAILGATE THROUGH CAPACITIVE COUPLERS

(71) Applicant: Ford Global Technologies, LLC, Dearborn, MI (US)

(72) Inventors: Hadi Malek, Dearborn, MI (US); Jacob Mathews, Canton, MI (US); Sara Dadras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 15/087,008

(22) Filed: Mar. 31, 2016

(65) Prior Publication Data
US 2017/0282718 A1 Oct. 5, 2017

(51) Int. Cl.
| H04M 1/00 | (2006.01) |
| B60R 1/12 | (2006.01) |
| B60R 16/02 | (2006.01) |
| B60R 9/06 | (2006.01) |
| H02J 50/80 | (2016.01) |
| B60Q 3/06 | (2006.01) |
| B60L 1/00 | (2006.01) |

(52) U.S. Cl.
CPC ................ *B60L 1/00* (2013.01); *B60L 1/006* (2013.01); *B60L 2200/28* (2013.01); *Y02T 90/16* (2013.01)

(58) Field of Classification Search
CPC .... B60L 1/00; B60L 11/18; B60Q 1/00; H02J 7/02
USPC .................................................. 307/9.1–10.8
See application file for complete search history.

(56) References Cited

U.S. PATENT DOCUMENTS

| 8,975,772 | B2 | 3/2015 | Lakirovich et al. |
| 2007/0021157 | A1 | 1/2007 | Chen et al. |
| 2009/0040300 | A1 | 2/2009 | Scribner |
| 2010/0201189 | A1* | 8/2010 | Kirby .................. H04B 5/0037 307/9.1 |
| 2012/0235788 | A1* | 9/2012 | Lakirovich ............. H01F 38/14 340/5.64 |
| 2013/0060403 | A1* | 3/2013 | Kerr ...................... E05F 15/627 701/2 |
| 2013/0138301 | A1 | 5/2013 | Drummond et al. |

(Continued)

FOREIGN PATENT DOCUMENTS

| CN | 203027030 U | 6/2013 |
| CN | 203126673 U | 8/2013 |

(Continued)

OTHER PUBLICATIONS

Mitchell Kline, *Capacitive Power Transfer*, Electrical Engineering and Computer Sciences University of California at Berkeley, Dec. 15, 2010 (37 Pages).

(Continued)

*Primary Examiner* — Brandon S Cole
(74) *Attorney, Agent, or Firm* — Frank Lollo; Neal, Gerber & Eisenberg LLP; James P. Muraff

(57) ABSTRACT

Systems to wirelessly power transfer to a tailgate are disclosed. An example disclosed vehicle includes a transmitting circuit in a body of the vehicle configured to transmit power via wireless capacitive transfer. The example vehicle also includes a receiving circuit in a tailgate of the vehicle configured to receive power via wireless capacitive transfer.

16 Claims, 3 Drawing Sheets

(56) References Cited

U.S. PATENT DOCUMENTS

| | | | | |
|---|---|---|---|---|
| 2014/0136021 | A1* | 5/2014 | Bambenek | G07C 5/008 |
| | | | | 701/2 |
| 2014/0203663 | A1* | 7/2014 | Waffenschmidt | H02J 5/005 |
| | | | | 307/109 |
| 2014/0252813 | A1* | 9/2014 | Lee | H02J 17/00 |
| | | | | 297/180.12 |
| 2015/0054950 | A1 | 2/2015 | Van Wiemeersch | |
| 2015/0188345 | A1 | 7/2015 | Sohn et al. | |
| 2015/0191137 | A1 | 7/2015 | Martin Grant | |
| 2015/0266421 | A1* | 9/2015 | Brubaker | B60R 1/00 |
| | | | | 348/148 |
| 2015/0267454 | A1* | 9/2015 | Wuerstlein | E05F 15/60 |
| | | | | 701/49 |
| 2015/0298629 | A1 | 10/2015 | Weigert et al. | |
| 2016/0001700 | A1* | 1/2016 | Salter | B60Q 1/56 |
| | | | | 362/510 |
| 2016/0245671 | A1* | 8/2016 | Wuerstlein | G01N 27/221 |
| 2018/0086279 | A1* | 3/2018 | Anton | B60R 9/10 |

FOREIGN PATENT DOCUMENTS

| | | |
|---|---|---|
| DE | 102005045196 A1 | 9/2006 |
| DE | 102013011444 A1 | 1/2015 |
| DE | 102013226326 A1 | 2/2015 |
| JP | 2008001250 A | 1/2008 |
| KR | 100482155 B1 | 4/2005 |

OTHER PUBLICATIONS

Mitchell Kline et al., *Capacitive Power Transfer for Contactless Charging* (32 Pages).

Chenyang Xia, *Comparison of Power Transfer Characteristics Between CPT and IPT System and Mutual Inductance Optimization for IPT System* (8 Pages).

Search Report dated Aug. 25, 2017 for GB Patent Application No. GB1704383.7 (5 pages).

\* cited by examiner

WIRELESS POWER TRANSFER TO A TAILGATE THROUGH CAPACITIVE COUPLERS

TECHNICAL FIELD

The present disclosure generally relates to a power bus of a vehicle and, more specifically, wireless power transfer through capacitive coupling to the tailgate.

BACKGROUND

Rear doors are attached to vehicles (such as pickup trucks, sport utility vehicles, hatchbacks, etc.) via hinged connections. Increasingly, tailgates house electronics that require power. Currently, a wire harness connects the electronics in the tailgates to the power and data bus of the vehicle. To remove the tailgates, the wire harness is first disconnected from the tailgate before the tailgate is removed from the vehicle. Then, the wire harness is reconnected after the tailgate is repaired. Connecting and disconnecting the wire harness is time consuming and increases the complexity of removing the tailgate during load or unloading the vehicle. Furthermore, this process can damage the wire harness over time. Also, because the tailgate is a moving part, proper protections are required to ensure the wires in the wire harness are not damaged on the edges of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments providing systems for wirelessly transferring power through capacitive couplers are disclosed. An example disclosed vehicle includes a transmitting circuit in a body of the vehicle or joints, configured to transmit power via wireless capacitive transfer. The example vehicle also includes a receiving circuit in a tailgate of the vehicle configured to receive power via wireless capacitive transfer.

Another example disclosed vehicle includes first conductive plates in a body of the vehicle. The example vehicle also includes second conductive plates in a tailgate of the vehicle. In the example, the second conductive plates are aligned with the first conductive plates when the tailgate is closed. Additionally, the example vehicle includes a transmitting circuit in the body of the vehicle, and a receiving circuit in the tailgate of the vehicle. In the example vehicle, the transmitting circuit transfers power to the receiving circuit when the first and second conductive plates are aligned.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
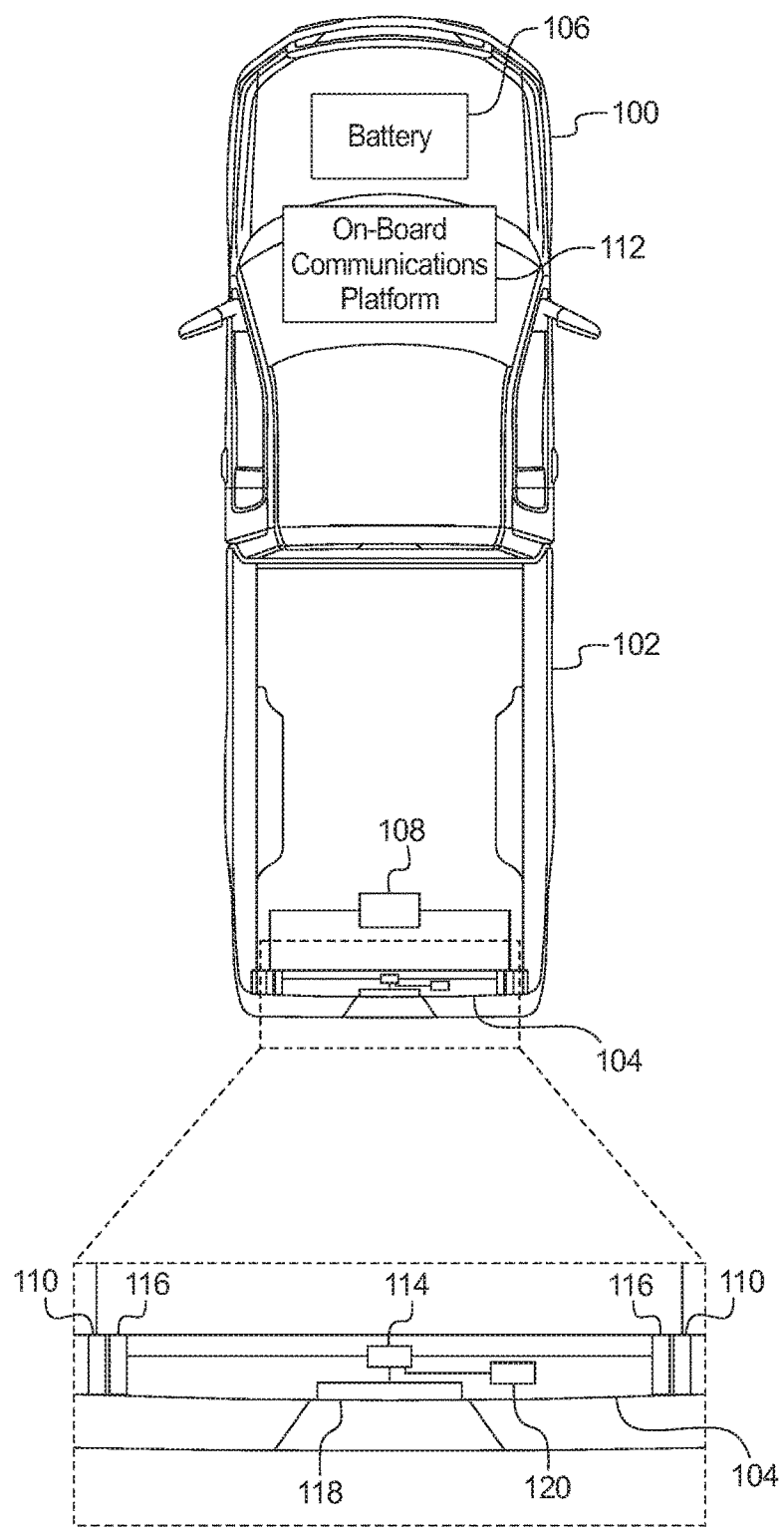
FIG. 1 is a vehicle with wireless power transfer to a tailgate in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As disclosed in more detail below, electronics (e.g., sensors, lights, electronic control units (ECUs), etc,) in a tailgate of a vehicle (e.g., a pickup truck, a sports utility vehicle, a hatchback, etc.) receive power via wireless power transfer. A tailgate is a rear door of the vehicle that has a hinge connection at the bottom and folds down. A liftgate is a rear door of the vehicle that has a hinge connection at the top and lifts up. As used herein, the term "tailgate" refers to both tailgates and liftgates. Wireless power transfer technology can transfer power through an air-gap. Inductive power transfer (IPT) uses a primary coil and a secondary coil coupled together through a magnetic field. IPT technology uses a high frequency signal, typically 20 kilohertz (kHz) to 10 megahertz (MHz), to generate the magnetic field. This high frequency signal can generate a large amount of electromagnetic interference (EMI). Additionally, the magnetic field is shielded by a conductive body (e.g., a body of the vehicle) and can induce heat generating-eddy currents in the conductive body. As discussed herein below, to wirelessly transfer power, the vehicle uses capacitive power transfer (CPT). CPT uses conductive plates coupled via an electric field. CPT technology can transfer power through the conductive body of the vehicle and does not generate a large amount of EMI.

In the example disclosed below, a CPT tailgate circuit includes a transmitting circuit in the body of the vehicle and a receiving circuit in the tailgate. Additionally, the body of the vehicle has two or more conductive plates and the tailgate has two or more corresponding conductive plates. When the tailgate is closed, the conductive plates are aligned with the corresponding conductive plates of the tailgate. Additionally, when the tailgate is closed, the conductive plates are separated by a non-conductive material, such as air (sometime referred to as an "air gap"). When the conductive plates are aligned, the transmitting circuit induces current in the receiving circuit, which provides power to the electronics eclectically coupled to the receiving circuit.

FIG. 1 is a vehicle 100 with a body 102 configured to wirelessly transfer power to a tailgate 104 in accordance with the teachings of this disclosure. The vehicle 100 may be a standard gasoline powered vehicle, a hybrid vehicle, an electric vehicle, a fuel cell vehicle, or any other type of vehicle. The vehicle 100 may be non-autonomous, semi-autonomous, or autonomous. The vehicle 100 includes parts related to mobility, such as a powertrain with an engine, a transmission, a suspension, a driveshaft, and/or wheels, etc.

In the illustrated examples, the body 102 includes a battery 106, a transmitting circuit 108, transmitter plates 110, and an on-board communication platform 112. The battery 106 provides direct current (DC) power to a power bus. In some examples, the battery 106 is a 12.6 volt (V) automotive battery. Additionally or alternatively, the battery 106 is an electric vehicle battery. The transmitting circuit 108 is electrically coupled to the battery 106 and the transmitter plates 110. As discussed in connection with FIG. 3 below, the transmitting circuit 108 converts the DC power from the battery 106 to an alternating current (AC) signal. The AC signal is applied to the transmitter plates 110 to generate an alternating electric field at a switching frequency.

The example tailgate 104 includes a receiving circuit 114, receiver plates 116, electronic components 118, and a wireless data transfer node 120. The receiving circuit 114 is electrically coupled to the receiver plates 116, the electronic components 118, and the wireless data transfer node 120. When the tailgate is closed, the receiver plates 116 are electrically coupled to the transmitter plates 110 via the alternating electric field. As discussed in connection with FIG. 3 below, the receiving circuit 114 conditions the current induced by the alternating electrical field into DC power to supply to the electronic components 118, and a wireless data transfer node 120. In some examples, the receiving circuit supplied up to 50 Watts of power to the electronics 118 and/or the wireless communication node 120. The electronic components 118 include lights, sensors and/or electronic control units (ECUs). In some examples, the electronics components 118 include a camera configured to capture video and/or images behind the vehicle.

The on-board communication platform 112 includes hardware (e.g., processors, memory, storage, antenna, etc.) and software to control wireless network interfaces. The wireless data transfer node 120 includes hardware (e.g., processors, memory, storage, antenna, etc.) to wirelessly communicate with the on-board communication platform 112. In some examples, the on-board communication platform 112 and the wireless data transfer node 120 implement Bluetooth® Low Energy (BLE) to wirelessly communicate. The BLE protocol is set forth in Volume 6 of the Bluetooth Specification 4.0 (and subsequent revisions) maintained by the Bluetooth Special Interest Group. Alternatively, in some examples, the on-board communication platform 112 and the wireless data transfer node 120 implement other short range wireless protocols, such as ZigBee® (IEEE 802.15.4). The on-board communication platform 112 and the wireless data transfer node 120 communicative couple the electronic components 118 to a data bus (e.g., a controller area network (CAN) bus, etc.) of the vehicle 100. For example, the wireless data transfer node 120 may provide video and/or images from the camera to the data bus to be displayed on a center console display of an infotainment head unit.

Figure 2:
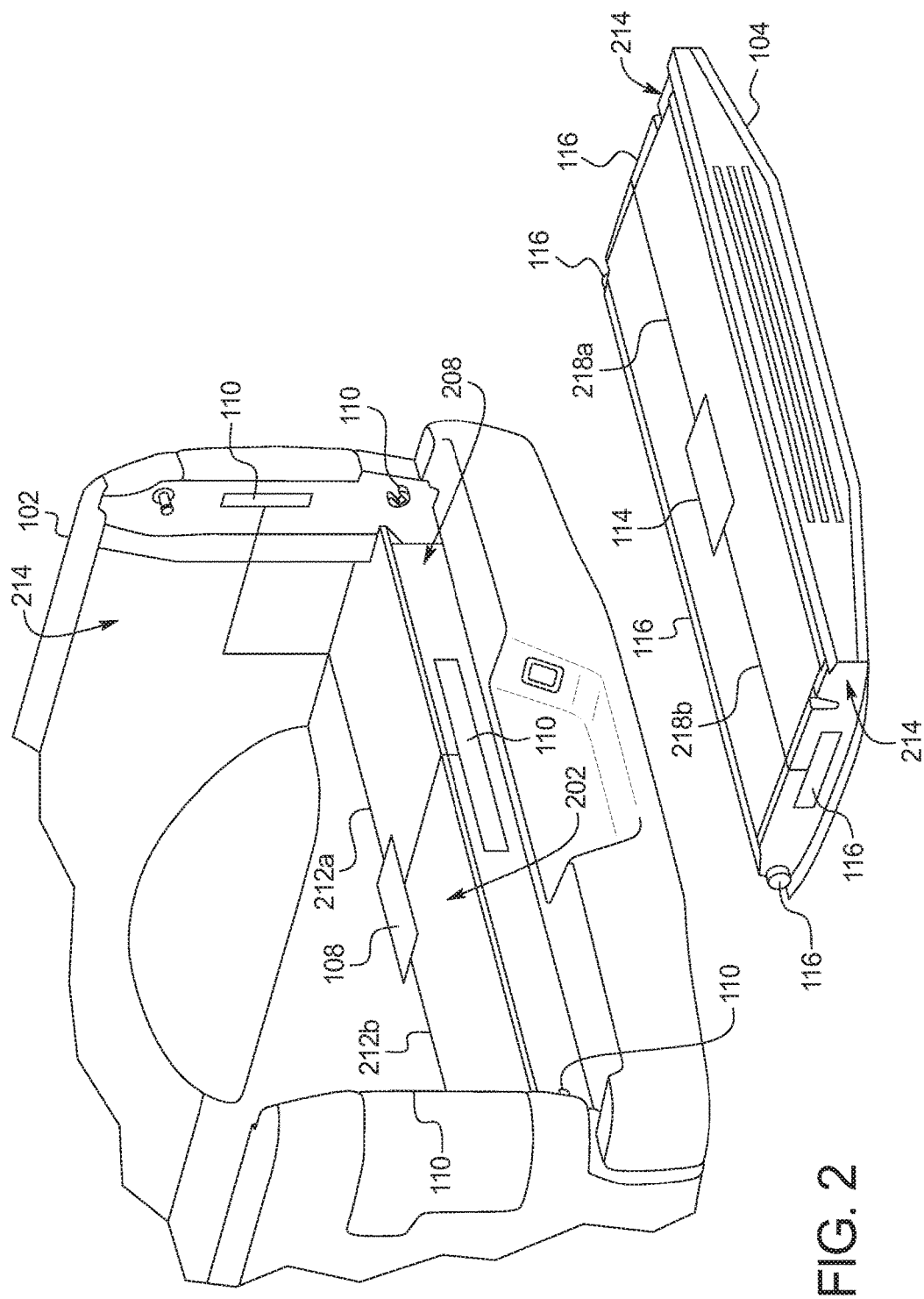
FIG. 2 depicts an exploded view of a tailgate of the vehicle of FIG. 1.

FIG. 2 depicts an exploded view of the tailgate 104 of the vehicle 100 of FIG. 1. The body 102 includes the transmitting circuit 108. In the illustrated example, the transmitting circuit 108 is in a bed 202 of the body 102. Alternatively, in some examples, the transmitting circuit 108 is in one of the walls 204 of the body 102. Two or more of the transmitter plates 110 are located on a side 206 and/or a bottom 208 of a frame 210 that defines an opening at an end of the bed 202 for the tailgate 104. At least one of the transmitter plates 110 is connected to a first line 212a and at least one of the transmitter plates 110 is connected to a second line 212b. In some examples, one of the transmitter plates 110 is connected to the first line 212a and two of the transmitter plates 110 are connected to the second line 212b. So that the tailgate 104 closes without interference, the transmitter plates 110 are built into the side frames 206 and/or the bottom frame 208 to be either (a) flush with the respective side frame 206 and/or the bottom frame 208, or (b) recessed into the respective side frame 206 and/or the bottom frame 208. In some examples, the transmitter plates 110 are positioned into the side frames 206 and/or the bottom frame 208 so that when the tailgate 104 is closed, the distance between the transmitter plates 110 and the receiver plates 116 is minimized while still maintaining a gap. Alternatively or additionally, in some examples, the transmitter plates 110 may be embedded into hinge joints that connect the tailgate 104 to the body 102 of the vehicle 100. In some examples, the transmitter plates 110 are coated with a dielectric material (e.g. polyethylene, polypropylene, etc.).

The tailgate 104 includes the receiving circuit 114. Two or more of the receiver plates 116 are positioned on side walls 214 and/or a bottom wall 216 of the tailgate 104. At least one of the receiver plates 116 is connected to a first line 218a and at least one of the receiver plates 116 is connected to a second line 218b. In some examples, one of the receiver plates 116 is connected to the first line 218a and two of the receiver plates 116 are connected to the second line 218b. So that the tailgate 104 closes without interference, the receiver plates 116 are built into the side walls 214 and/or the bottom wall 216 to be either (a) flush with the respective side wall 214 and/or the bottom wall 216, or (b) recessed into the respective side wall 214 and/or the bottom wall 216. In some examples, the receiver plates 116 are positioned into the side walls 214 and/or the bottom walls 216 so that when the tailgate 104 is closed, (a) the distance between the transmitter plates 110 and the receiver plates 116 is minimized while still maintaining the gap, and (b) the transmitter plates 110 in the body 102 are aligned with the corresponding the receiver plates 116 in the tailgate 104. In some examples, the receiver plates 116 are located within a hinge joint of the tailgate 104. In some examples, the receiver plates 116 are coated with a dielectric material (e.g. polyethylene, polypropylene, etc.).

Figure 3:
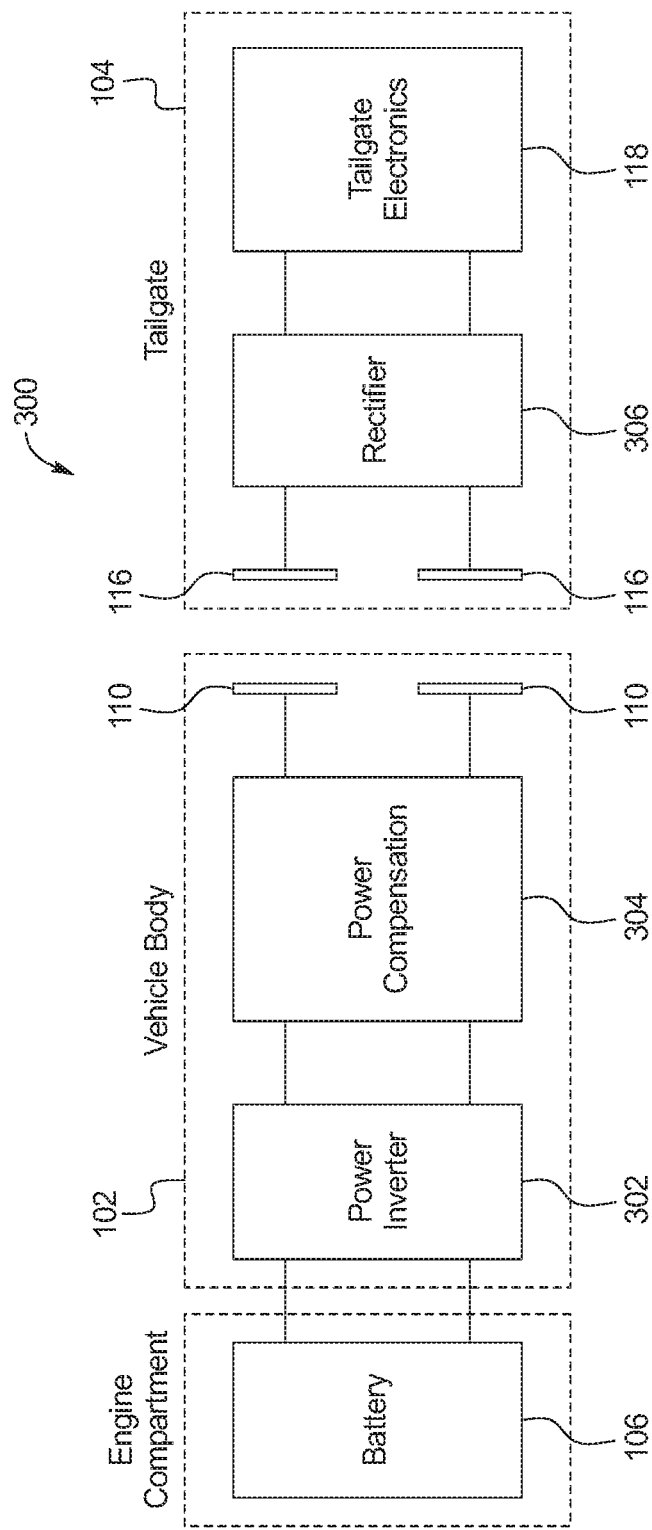
FIG. 3 depicts a block diagram of electronic circuits to wirelessly transfer power to the tailgate of FIGS. 1 and 2.

FIG. 3 depicts a block diagram of electronic circuits 300 to wirelessly transfer power to the tailgate of FIGS. 1 and 2. In the illustrated example, the electronic circuits include the battery 106, the transmitting circuit 108, the transmitter plates 110, the receiving circuit 114, the receiver plates 116, and the electronic components 118. In the illustrated example, the battery 106 is electrically coupled to a power inverter 302 via the power bus. The power inverter 302 converts the DC power of the battery 106 to AC power. The power inverter 302 is electrically coupled to the power compensation circuit 304. The power compensation circuit 304 tunes a resonant angular frequency of the transmitting circuit 108 to increase an efficiency of the transmitting circuit 108 based on the switch frequency of the power inverter 302 and the capacitance between the transmitter plates 110 and the receiver plates 116. In the illustrated example, the power compensation circuit 304 is electrically coupled to one of the transmitter plates 110 via the first line 212a and to another one of the transmitter plates 110 via the second line 212b.

The electronic components 118 are electrically coupled to the rectifier 306. The rectifier 306 converts the AC power received by the receiver plated 116 into DC power to be used by the electronic components 118. The rectifier 306 is electrically coupled to one of the receiver plates 116 via the first line 218a and to another one of the receiver plates 116 via the second line 218b.

The efficiency of CPT measures what portion of the power input into CPT from the battery 106 is available to be used on the electronic components 118 in the tailgate 104. The efficiency increases when the capacitive coupling between the receiver plates 116 and the transmitter plates 110 increases. Additionally, the efficiency is increased with a higher permittivity of the dielectric material (e.g., air, polyethene, etc.) between the plates 110 and 116. The capacitance between the receiver plates 116 and the transmitter plates 110 increases as the area of the plates 110 and 116 increase, and decreases as the distance between the plates 110 and 116 increases.

The power inverter 302, the power compensation circuit 304 and the rectifier 306 may be implemented by any combination of discrete components, integrated circuits, microprocessors, application-specific integrated circuits (ASICs), etc. For example, the power compensation circuit 304 may include inductors to tune the resonant angular frequency of the transmitting circuit 108. As another example, the rectifier 306 may be a diode bridge.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a transmitting circuit in a body of the vehicle configured to transmit power via wireless capacitive transfer;
   a receiving circuit in a tailgate of the vehicle configured to receive power via wireless capacitive transfer;
   a first set of plates electrically coupled to the transmitting circuit, the first set of plates disposed in a frame that receives the tailgate; and
   a second set of plates electrically coupled to the receiving circuit, the second set of plates disposed in-side the tailgate, the second set of plates aligned to the first set of plates when the tailgate is closed.

2. The vehicle of claim 1, wherein the transmitting circuit is electrically connected to a battery of the vehicle via a power bus.

3. The vehicle of claim 1, wherein the tailgate includes:
   a camera electrically coupled to the receiving circuit; and
   a first wireless communication node electrically coupled to the receiving circuit and the camera, the first wireless communication node communicatively coupled to a data bus of the vehicle via a second wireless communication node.

4. The vehicle of claim 1, wherein the body comprises at least one first conductive plate and at least one second conductive plate, and wherein the tailgate includes at least one third conductive plate and at least one fourth conductive plate.

5. The vehicle of claim 4, wherein, when the tailgate is in a first position with respect to the body, the at least one first conductive plate and the at least one third conductive plate are aligned.

6. The vehicle of claim 5, wherein, when the tailgate is in a second different position with respect to the body, the at least one second conductive plate and the least one fourth conductive plate are aligned.

7. The vehicle of claim 6, wherein, when the tailgate is in the second position, the at least one first conductive plate and the at least one third conductive plate are not aligned.

8. A vehicle comprising:
   first conductive plates in a body of the vehicle;
   second conductive plates in a tailgate of the vehicle, the second conductive plates aligning with the first conductive plates when the tailgate is closed;
   a transmitting circuit in the body of the vehicle; and
   a receiving circuit in the tailgate of the vehicle, the transmitting circuit to transfer power to the receiving circuit when the first and second conductive plates are aligned.

9. The vehicle of claim 8, wherein when the tailgate is closed, the first conductive plates are not in contact with the second conductive plates.

10. The vehicle of claim 8, including:
    a first wireless transceiver in the body of the vehicle; and
    a second wireless transceiver in the tailgate of the vehicle.

11. The vehicle of claim 10, wherein the first and second wireless transceivers communicatively couple sensors in the tailgate to a data bus of the vehicle.

12. The vehicle of claim 10, wherein the first and second transceivers communicate using the BLUETOOTH LOW ENERGY protocol.

13. The vehicle of claim 10, wherein the second wireless transceiver is electrically coupled to the receiving circuit, the second wireless transceiver to receive power from the receiving circuit.

14. The vehicle of claim 8, wherein the first conductive plates are disposed within opposing sides of a frame of the body, the frame to accept the tailgate when the tailgate is closed.

15. The vehicle of claim 8, wherein the second conductive plates are disposed within opposing sides to the tailgate.

16. The vehicle of claim 8, the tailgate including a camera electrically coupled to the receiving circuit, the camera to receive power from the receiving circuit.

* * * * *